(No Model.)
P. B. GRIMES.
NUT LOCK.
No. 465,849.  Patented Dec. 29, 1891.
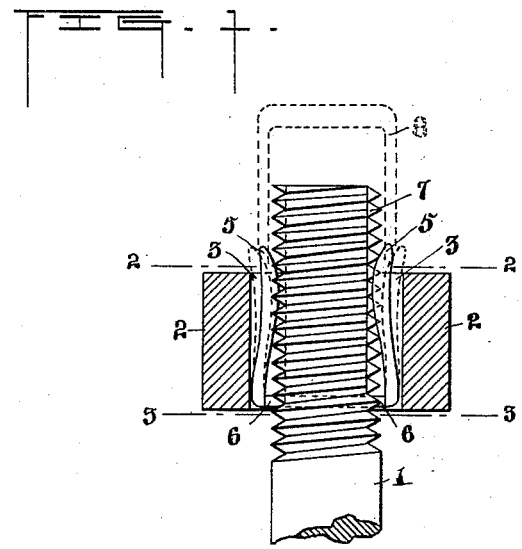
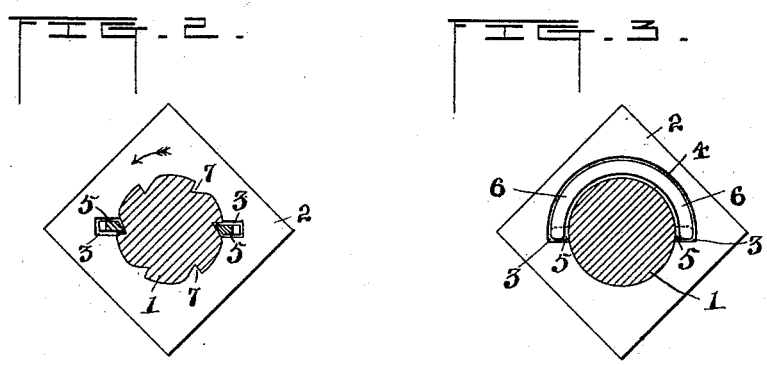
WITNESSES
Arch. M. Catlin.
M. R. Snyder.
INVENTOR
Phillips B. Grimes
by
Benj. R. Catlin Atty.

UNITED STATES PATENT OFFICE.

PHILLIPS BAILEY GRIMES, OF GLENWOOD, MISSOURI.

NUT-LOCK.

SPECIFICATION forming part of Letters Patent No. 465,849, dated December 29, 1891.

Application filed May 6, 1891. Serial No. 391,751. (No model.)

*To all whom it may concern:*

Be it known that I, PHILLIPS BAILEY GRIMES, a resident of Glenwood, in the county of Schuyler and State of Missouri, have invented certain new and useful Improvements in Nut-Locks; and I do hereby declare the following to be a full, clear, and exact description of the invention, such as will enable others skilled in the art to which it pertains to make and use the same.

The invention relates to that class of nut-locks in which the lock is operative on the screw-bolt within the nut, and which requires a special device for releasing the lock; and it is an improvement upon a device patented to me under date of March 18, 1891, and numbered 447,771; and the invention consists in the matter hereinafter described, and particularly pointed out.

In the accompanying drawings, Figure 1 is a longitudinal section of a nut and bolt, the lock being shown within the nut and the bolt partly broken away. Fig. 2 is a transverse section on line 2 2 of Fig. 1, and Fig. 3 is a similar section on line 3 3 of the same figure.

Numeral 1 indicates a screw-threaded bolt of any desired size, the head and part of the body being broken away.

2 denotes a nut of ordinary form, provided with longitudinal recesses or grooves 3 3 in its inner screw-threaded surface and with a peripheral recess or groove 4, extending from one longitudinal recess 3 to the other at or near one end of the nut. Within the continuous bed or channel formed by these connected grooves is placed an approximately U-shaped spring, having the two nearly parallel arms 5 5, connected by the curved portion 6, which is so shaped as to fit in the recess 4 when the arms 5 are in the recess 3. This spring, shaped as set forth and as indicated in the drawings, is adapted to lie within the nut and in its grooves and offers no material resistance to the insertion of the bolt, which can be readily screwed into or through the nut in usual manner, the arms 5 of the spring being pressed back in the grooves 3 by the threads of the bolt.

7 7 indicate longitudinal notches or grooves cut across the bolt-threads. These notches have each a face or shoulder in or near a plane situated radially with respect to the bolt, the opposite face of the notch being inclined to the same and the construction being such that when the bolt is screwed into the nut the spring-arms 5 slip over the notches, but engage the radial faces of said notches when it is attempted to remove the nut by unscrewing it. Such engagement is indicated in Figs. 1 and 2. Referring to the latter figure, it will be seen that the nut could be turned in the direction of the arrow, the spring-arms being pushed back into recesses 3 by the threads of the bolt, but that it could not be turned in the contrary direction for the reason that the arms would bear at right angles against the shoulders or radial faces of the notches 7. In Fig. 1 the spring-arms are represented in full lines as thus engaged.

To remove the nut it is necessary to push the arms outwardly and back into the recesses in the nut, which can be conveniently effected by a thimble 8, adapted to be passed onto the end of the bolt and between it and the outwardly turned ends of the spring-arms, whereby the latter can be crowded outwardly, the thimble being pushed in between them and the bolt, as indicated in dotted lines in Fig. 1, whereupon the nut can be unscrewed from the bolt. Disconnected springs have before been used for a similar purpose. Said springs are required to be secured in the recesses in the nuts by special means—as, for example, by forming the recesses in dovetail form and shaping the ends of the springs to fit the same or by casting them into the nut. Either of these means is inconvenient to produce, and, besides, they impair the elasticity of a considerable part of the springs, which in this form are necessarily short, as it is desirable that their length should not much exceed that of the nut, and such springs cannot be readily removed or replaced.

By the present improvement the longitudinal recesses in the nut are connected by a circumferential one, whereby they are adapted to receive a single spring, provided with the arms 5 and the curved connection 6. A spring of this form is held in place when the nut is screwed upon the bolt by the circumferential recess without any fastening. It can also be readily removed and replaced, or if impaired another can be substituted. The elasticity of the entire spring, which will generally exceed that of two short independent springs, is utilized, which is a specially desirable feature where in the construction by the nature of the case the dimensions of an ordinary spring must be quite small. The improved construction also provides for using a cheaper spring material, both by reason of its utilizing more of its elasticity and because defective ones can be more readily replaced. They can also be entirely removed without trouble, and, if desired, they can be retempered.

Heretofore a locking-wire of U shape has been applied to a bolt, so as to engage longitudinal grooves therein; but in such prior construction that portion of the wire or spring that connected the two arms thereof was exposed at the end of the bolt and afforded means for its removal. Moreover, the spring did not move on the bolt together with the nut. It also required a special fastening.

Having thus described my invention, what I desire to secure by Letters Patent is—

In a nut-lock, the screw-threaded bolt provided with a series of notches across its threads lengthwise of the bolt, the correspondingly-threaded nut provided on its interior with longitudinal recesses joined by a circumferential recess, and a spring having arms with outwardly-flaring ends and joined by a curved portion resting in the said circumferential recess and held by the walls thereof, the whole spring being adapted to lie in the recesses in the nut and being movable lengthwise of the bolt with said nut and having its arms adapted to bear on the notched bolt, whereby the elasticity of the entire spring is made available and whereby its ready removal from or insertion in the nut when free from the bolt is provided for, being held in the recesses specified without welding or other fastening, substantially as set forth.

In testimony whereof I have signed this specification in the presence of two subscribing witnesses.

PHILLIPS BAILEY GRIMES.

Witnesses:
HORACE A. JONES,
ORVIN THOMPSON.

It is hereby certified that in Letters Patent No. 465,849, granted December 29, 1891, upon the application of Philips Bailey Grimes, of Glenwood, Missouri, for an improvement in "Nut-Locks," an error appears in the printed specification requiring correction as follows: In line 16, page 1, the date, "March 18, 1891," should read *March 10, 1891;* and that the Letters Patent should be read with this correction therein that the same may conform to the record of the case in the Patent Office.

Signed, countersigned, and sealed this 2d day of February, A. D. 1892.

[SEAL]
                CYRUS BUSSEY,
              *Assistant Secretary of the Interior.*

Countersigned:
 W. E. SIMONDS,
  *Commissioner of Patents.*